US008425799B2

(12) United States Patent
Kwak et al.

(10) Patent No.: US 8,425,799 B2
(45) Date of Patent: Apr. 23, 2013

(54) PHOTOALIGNMENT AGENT OF LIQUID CRYSTAL, PHOTOALIGNMENT FILM OF LIQUID CRYSTAL INCLUDING THE SAME, AND LIQUID CRYSTAL DISPLAY INCLUDING THE SAME

(75) Inventors: Tae-Hyoung Kwak, Goyang (KR); Dong-Seon Uh, Seoul (KR); Jae-Min Oh, Suwon (KR); Jae-Deuk Yang, Osan (KR)

(73) Assignee: Cheil Industries Inc., Gumi-si (KR)

( * ) Notice: Subject to any disclaimer, the term of this patent is extended or adjusted under 35 U.S.C. 154(b) by 32 days.

(21) Appl. No.: 12/676,012

(22) PCT Filed: Dec. 31, 2007

(86) PCT No.: PCT/KR2007/007037
§ 371 (c)(1),
(2), (4) Date: Mar. 2, 2010

(87) PCT Pub. No.: WO2009/048201
PCT Pub. Date: Apr. 16, 2009

(65) Prior Publication Data
US 2010/0188628 A1 Jul. 29, 2010

(30) Foreign Application Priority Data

Oct. 10, 2007 (KR) .................. 10-2007-0102030
Oct. 23, 2007 (KR) .................. 10-2007-0106691

(51) Int. Cl.
*C09K 19/56* (2006.01)
*G02F 1/1335* (2006.01)

(52) U.S. Cl.
USPC ....... 252/299.4; 428/1.2; 428/1.25; 428/1.26; 349/124

(58) Field of Classification Search ............. 252/299.4; 428/1.2, 1.25, 1.26
See application file for complete search history.

(56) References Cited

U.S. PATENT DOCUMENTS

| | | | |
|---|---|---|---|
| 5,773,559 A | 6/1998 | Miyamoto et al. | |
| 5,866,034 A | 2/1999 | Han | |
| 6,001,277 A | 12/1999 | Ichimura et al. | |
| 6,307,002 B1 | 10/2001 | Okada et al. | |
| 6,348,245 B1 | 2/2002 | Auman et al. | |
| 6,731,362 B2 | 5/2004 | Park et al. | |
| 6,852,826 B2 | 2/2005 | Fujihara et al. | |
| 7,074,344 B2 | 7/2006 | Nakata et al. | |
| 7,090,900 B2 | 8/2006 | Ono et al. | |
| 7,537,812 B2 | 5/2009 | Kurosaki et al. | |
| 8,057,700 B2 * | 11/2011 | Oh et al. ................. | 252/299.4 |
| 2003/0151032 A1 | 8/2003 | Ito et al. | |
| 2004/0158030 A1 | 8/2004 | Okada | |
| 2005/0058780 A1 | 3/2005 | Ono et al. | |
| 2005/0271833 A1 | 12/2005 | Matsumori et al. | |
| 2006/0149028 A1 | 7/2006 | Oh et al. | |
| 2007/0036915 A1 | 2/2007 | Kurosaki et al. | |
| 2007/0093640 A1 | 4/2007 | Kim et al. | |
| 2007/0128378 A1 | 6/2007 | Kim et al. | |
| 2008/0213510 A1 * | 9/2008 | Kwak et al. ................. | 428/1.26 |

FOREIGN PATENT DOCUMENTS

| | | |
|---|---|---|
| CN | 1172827 A1 | 2/1998 |
| CN | 1701086 | 11/2005 |
| CN | 1710467 | 12/2005 |
| CN | 1748177 | 3/2006 |
| EP | 0409194 A1 | 1/1991 |
| EP | 1450203 A1 | 8/2004 |
| JP | 59-145216 | 8/1984 |
| JP | 61-059334 | 3/1986 |
| JP | 07-209654 | 8/1995 |
| JP | 08-208983 | 8/1996 |
| JP | 8-208983 A | 8/1996 |
| JP | 09-080440 | 3/1997 |
| JP | 10-259378 A | 9/1998 |
| JP | 2002-196490 A | 7/2002 |
| JP | 2005-037920 | 2/2005 |
| JP | 2005-275364 A | 10/2005 |
| JP | 2006-124650 A | 5/2006 |
| KR | 10-1998-0059346 | 10/1998 |
| KR | 100213178 B1 | 5/1999 |
| KR | 1020000035320 A | 6/2000 |
| KR | 10-2002-0068695 A | 8/2002 |
| KR | 10-2004-0050166 A | 6/2004 |
| KR | 1020040083610 A | 10/2004 |
| KR | 1020050065051 A | 6/2005 |
| KR | 10-2005-0106423 A | 11/2005 |
| KR | 10-2006-0076411 A | 7/2006 |
| KR | 2005-0106423 B1 | 11/2006 |
| KR | 1020070057658 A | 6/2007 |
| TW | 428011 | 4/2001 |
| TW | 583441 | 4/2004 |
| WO | 2009/048201 A1 | 4/2009 |

OTHER PUBLICATIONS

International Search Report in counterpart International Application No. PCT/KR2007/007037, dated Jul. 9, 2008.
European Search Report in counterpart European Application No. 07860812.2 dated Nov. 7, 2012, pp. 1-7.
Office Action in commonly owned U.S. Appl. No. 11/967,374 mailed Nov. 14, 2011, pp. 1-13.
Office Action in commonly owned U.S. Appl. No. 11/967,374 mailed May 7, 2012, pp. 1-11.

* cited by examiner

*Primary Examiner* — Shean C Wu
(74) *Attorney, Agent, or Firm* — Summa, Additon & Ashe, P.A.

(57) ABSTRACT

The present invention provides a liquid crystal photoalignment agent that includes a compound selected from the group consisting of a polyamic acid having a predetermined chemical formula, a polyimide polymer having a predetermined chemical formula, and a combination thereof, and a polyimide photopolymer. The liquid crystal photoalignment agent shows a long life-span, stably maintains a pretilt angle, and shows improved after-image characteristics, liquid crystal alignment properties, and chemical resistance.

18 Claims, 1 Drawing Sheet

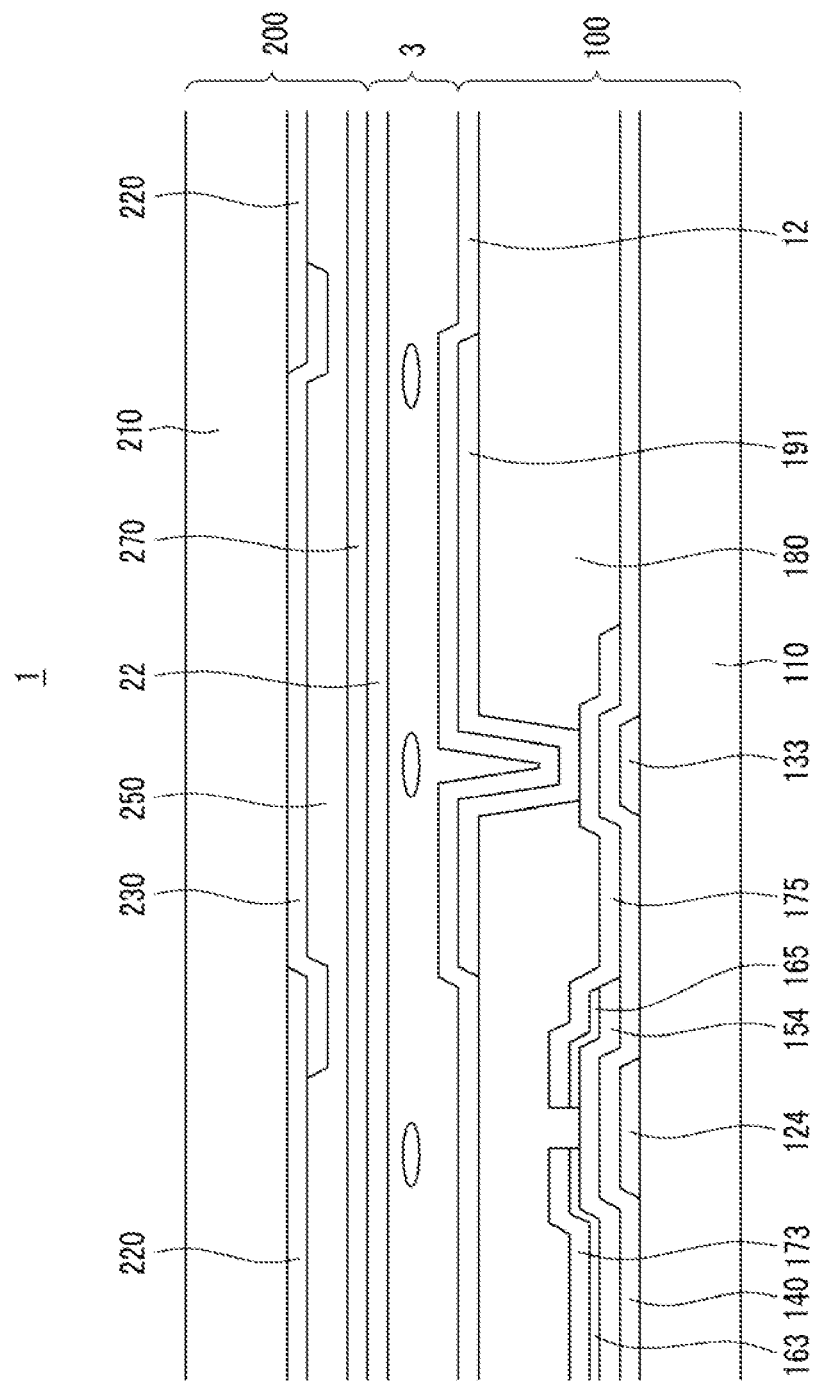

PHOTOALIGNMENT AGENT OF LIQUID CRYSTAL, PHOTOALIGNMENT FILM OF LIQUID CRYSTAL INCLUDING THE SAME, AND LIQUID CRYSTAL DISPLAY INCLUDING THE SAME

CROSS-REFERENCE TO RELATED APPLICATIONS

This application is a national stage application under 35 USC Section 371 and claims priority to and the benefit of International Application No. PCT/KR2007/007037, filed Dec. 31, 2007, designating the U.S. and published as WO 2009/048201, and further claims priority to and the benefit of Korean Patent Application No. 10-2007-0102030 filed in the Korean Intellectual Property Office on Oct. 10, 2007, and Korean Patent Application No. 10-2007-0106691 filed in the Korean Intellectual Property Office on Oct. 23, 2007, wherein the entire disclosure of each of the foregoing is incorporated herein by reference.

BACKGROUND OF THE INVENTION (a) Field of the Invention

The present invention relates to a photoalignment agent of a liquid crystal for a liquid crystal display (LCD) and a liquid crystal photoalignment film made using the same. More particularly, the present invention relates to a photoalignment agent of a liquid crystal having a long life-span, being capable of stably maintaining a pretilt angle, having improved after-image characteristics, and having excellent liquid crystal alignment properties and chemical resistance.

(b) Description of the Related Art

A liquid crystal display (LCD) includes a liquid crystal alignment layer. The liquid crystal alignment film is mainly made of polymer materials. The liquid crystal alignment film plays a role of a director in aligning liquid crystal molecules. When the liquid crystal molecules are moved by the influence of an electric field to display an image, the liquid crystal alignment film allows them to be oriented in a predetermined direction. Generally, it is necessary to uniformly align the liquid crystal molecules in order to provide uniform luminance and a high contrast ratio to the liquid crystal device.

The conventional method of aligning the liquid crystal includes coating a polymer film such as a polyimide on a substrate made of a material such as glass, and rubbing the surface of the substrate with a fiber such as nylon or polyester in a certain direction. However, the rubbing method may cause serious problems while fabricating a liquid crystal panel due to fine dust or electrostatic discharge (ESD) that may be generated while rubbing the polymer film with the fiber.

In order to solve the problems of the rubbing method, the photo-radiation method has recently been researched to induce anisotropy to the polymer film by irradiating light on the membrane so as to align the liquid crystal molecules.

As polymer film materials for the photoalignment method, polymers having photo-functional groups such as azobenzene, cumarin, chalcone, and cinnamate have been suggested. Such polymers are anisotropically photo-isomerized or photo-cross-linked by being irradiated with polarized light, so as to provide anisotropy to the surface so that it can induce the liquid crystal molecules to align in a certain direction.

The material for the liquid crystal alignment film should have optical stability and thermal stability, as well as no after-image in order to apply it a substantial liquid crystal display device (LCD). However, the conventional photoalignment materials have many troubles in this respect.

Further, the conventional material for the liquid crystal photoalignment film is mainly polymeric that has a main chain of a polymer and a side group of a photo-functional group that is capable of inducing the photo-anisotropy, such as azobenzene or cinnamate. When the material for a polymeric liquid crystal photoalignment film is used, it may cause problems not only in that a lot of photo energy is required to induce the anisotropy, but also that the thermal stability, optical stability, and electro-optical characteristics are seriously affected by a plurality of unreacted remaining photo-functional groups.

SUMMARY OF THE INVENTION

An exemplary embodiment of the present invention provides a photoalignment agent of a liquid crystal for a liquid crystal display (LCD) and a liquid crystal photoalignment film made using the same.

Another embodiment of the present invention provides a photoalignment agent of a liquid crystal for a wide-viewing angle having stability for a change of operation conditions, high after-image-related reliability, stable strength for vertical alignment, and an excellent alignment property for the liquid crystal, wherein the strength for the vertical alignment is not decreased when dropping the liquid crystal in the one drop filling (ODF) method.

A further embodiment of the present invention provides a liquid crystal photoalignment film prepared by the photoalignment agent of a liquid crystal.

A further embodiment of the present invention provides a liquid crystal display (LCD) including the liquid crystal photoalignment film.

The embodiments of the present invention are not limited to the above technical purposes, and a person of ordinary skill in the art can understand other technical purposes.

According to one embodiment of the present invention, provided is a liquid crystal photoalignment agent that includes a compound selected from the group consisting of polyamic acid represented by the following Chemical Formula 1, a polyimide polymer represented by the following Chemical Formula 2, a combination thereof, and a polyimide photopolymer represented by the following Chemical Formula 3.

[Chemical Formula 1]

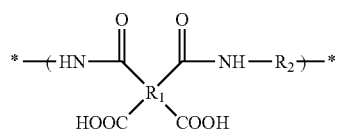

[Chemical Formula 2]

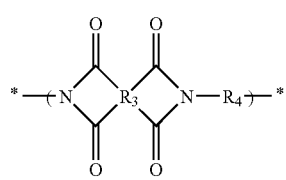

[Chemical Formula 3]

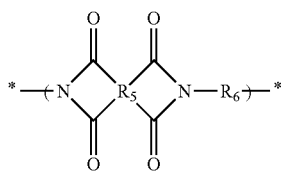

In the above Formulae 1 to 3:

$R_1$, $R_3$, and $R_5$ are independently a quadrivalent organic group derived from an acid dianhydride selected from the group consisting of an aliphatic cyclic acid dianhydride and an aromatic acid dianhydride;

$R_2$ and $R_4$ are independently a divalent organic group derived from an aromatic diamine; and $R_6$ is a divalent organic group derived from a photodiamine selected from the group consisting of a cumarin-based photodiamine, a chalcone-based photodiamine, and a cinnamate-based photodiamine.

According to another embodiment of the present invention, provided is a liquid crystal photoalignment layer that is produced by coating the photoalignment agent of a liquid crystal on a substrate.

According to a further embodiment of the present invention, provided is a liquid crystal display (LCD) including the liquid crystal photoalignment film.

Hereinafter, the embodiments of the present invention will be described in detail.

The photoalignment agent of a liquid crystal according to one embodiment of the present invention has excellent optical and thermal stability and good reliability with respect to after-images. Particularly, the photoalignment agent of a liquid crystal can improve the display quality in a liquid crystal display because it has a long life-span, it can stably maintain a pretilt angle, it improves after-image characteristics, and it improves the liquid crystal alignment property and the chemical resistance. As a result, it is applicable to a photoalignment agent of a liquid crystal for an LCD TV. Furthermore, the liquid crystal photoalignment film does not deteriorate the alignment film properties due to the processes of the liquid crystal dropping or the cleaning when fabricating an LCD panel.

BRIEF DESCRIPTION OF THE DRAWING

FIG. 1 is a cross-sectional view of a liquid crystal display (LCD) according to one embodiment of the present invention.

DETAILED DESCRIPTION OF THE INVENTION

Exemplary embodiments of the present invention will hereinafter be described in detail. However, these embodiments are only exemplary, and the present invention is not limited thereto.

The liquid crystal photoalignment agent according to one embodiment of the present invention includes a compound selected from the group consisting of a polyamic acid represented by the following Chemical Formula 1, a polyimide polymer represented by the following Chemical Formula 2, a combination thereof, and a polyimide photopolymer represented by the following Chemical Formula 3.

[Chemical Formula 1]

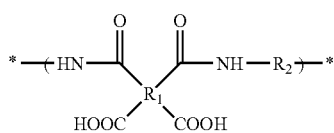

[Chemical Formula 2]

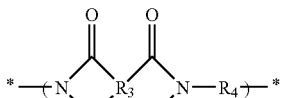

[Chemical Formula 3]

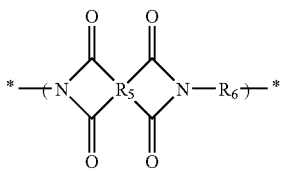

In the above Formulae 1 to 3:

$R_1$, $R_3$, and $R_5$ are independently a quadrivalent organic group derived from an acid dianhydride selected from the group consisting of an aliphatic cyclic acid dianhydride and an aromatic acid dianhydride;

$R_2$ and $R_4$ are independently a divalent organic group derived from an aromatic diamine; and $R_6$ is a divalent organic group derived from a photodiamine selected from the group consisting of a cumarin-based photodiamine, a chalcone-based photodiamine, and a cinnamate-based photodiamine.

In the present specification, a substituted alkyl, a substituted alkylene, a substituted cycloalkylene, a substituted heterocycloalkylene, a substituted aryl, a substituted arylene, a substituted heteroaryl, a substituted heteroarylene, a substituted alkylaryl, a substituted pyrimidinyl, a substituted pyridinyl, a substituted thiophenyl, a substituted furanyl, a substituted naphthyl, and a substituted phenyl are an alkyl, an alkylene, a cycloalkylene, a heterocycloalkylene, an aryl, an arylene, a heteroaryl, a heteroarylene, an alkylaryl, a pyrimidinyl, a pyridinyl, a thiophenyl, a furanyl, a naphthyl, and a phenyl that are independently substituted with a halogen, a C1 to C30 alkyl, a C1 to C30 haloalkyl, a C6 to C30 aryl, a C2 to C30 heteroaryl, or a C1 to C30 alkoxy.

In the present specification, the heterocycloalkylene, heteroaryl, and heteroarylene respectively refer to a cycloalkylene, an aryl, and an arylene including 1 to 3 heteroatoms selected from the group consisting of nitrogen (N), oxygen (O), sulfur (S), and phosphorus (P), and the remainder being carbon.

The polyamic acid of the above Chemical Formula 1 is synthesized from a diamine selected from the group consisting of an aromatic diamine, a functional diamine, and a combination thereof, and an acid dianhydride selected from the group consisting of an aliphatic cyclic acid dianhydride, an aromatic acid dianhydride, and a combination thereof.

Copolymerization of the acid dianhydride and diamine to obtain polyamic acid can be performed according to conventional copolymerization.

The aliphatic cyclic acid dianhydride used during preparation of polyamic acid includes a compound selected from the group consisting of 1,2,3,4-cyclobutanetetracarboxylic acid dianhydride (CBDA), 5-(2,5-dioxotetrahydrofuryl)-3-methylcyclohexene-1,2-dicarboxylic acid anhydride (DOCDA), bicyclooctene-2,3,5,6-tetracarboxylic acid dianhydride (BODA), 1,2,3,4-cyclopentanetetracarboxylic acid dianhydride (CPDA), 1,2,4,5-cyclohexanetetracarboxylic acid dianhydride (CHDA), 1,2,4-tricarboxyl-3-methylcarboxylcyclopentane dianhydride, 1,2,3,4-tetracarboxyl cyclopentane dianhydride, and combinations thereof, but is not limited thereto.

The quadrivalent organic group derived from the aliphatic cyclic acid dianhydride may be selected from the group consisting of compounds represented by the following Chemical Formulae 4 to 8, and combinations thereof.

[Chemical Formula 4]

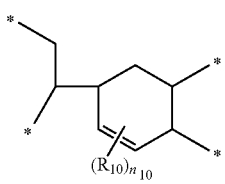

[Chemical Formula 5]

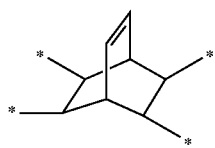

[Chemical Formula 6]

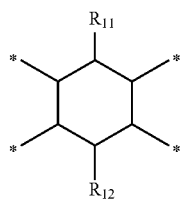

[Chemical Formula 7]

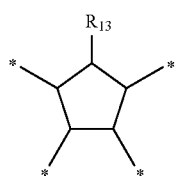

[Chemical Formula 8]

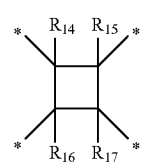

In the above Formulae 4 to 8:

$R_{10}$ is a substituent selected from the group consisting of a substituted or unsubstituted C1 to C20 alkyl, a substituted or unsubstituted C1 to C30 aryl, and a substituted or unsubstituted C2 to C30 heteroaryl, $n_{10}$ is an integer ranging from 0 to 3; and $R_{11}$ to $R_{17}$ are substituents independently selected from the group consisting of hydrogen, a substituted or unsubstituted C1 to C20 alkyl, a substituted or unsubstituted C1 to C30 aryl, and a substituted or unsubstituted C2 to C30 heteroaryl.

The aromatic acid dianhydride used during preparation of the polyamic acid includes a compound selected from the group consisting of pyromellitic acid dianhydride (PMDA), biphthalic acid dianhydride (BPDA), oxydiphthalic acid dianhydride (ODPA), benzophenone tetracarboxylic acid dianhydride (BTDA), hexafluoroisopropylidene diphthalic acid dianhydride (6-FDA), and combination thereof, but is not limited thereto.

The quadrivalent organic group derived from the aromatic acid dianhydride may include a structure selected from the group consisting of a compound represented by the following Formula 9, a compound represented by the following Formula 10, and a combination thereof.

[Chemical Formula 9]

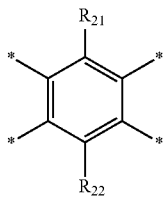

[Chemical Formula 10]

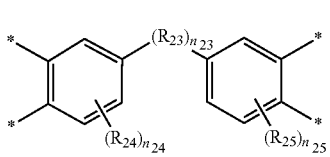

In the above Formulae 9 and 10:

$R_{21}$ and $R_{22}$ are independently a substituent selected from the group consisting of hydrogen, a substituted or unsubstituted C1 to C20 alkyl, a substituted or unsubstituted C1 to C30 aryl, and a substituted or unsubstituted C2 to C30 heteroaryl;

$R_{24}$ and $R_{25}$ are independently substituents selected from the group consisting of a substituted or unsubstituted C1 to C20 alkyl, a substituted or unsubstituted C1 to C30 aryl, and a substituted or unsubstituted C2 to C30 heteroaryl, and $n_{24}$ and $n_{25}$ are independently integers ranging from 0 to 3; and $R_{23}$ is selected from the group consisting of O, CO, a substituted or unsubstituted C1 to C6 alkylene such as $C(CF_3)_2$, a substituted or unsubstituted C3 to C30 cycloalkylene, and a substituted or unsubstituted C2 to C30 heteracycloalkylene, and $n_{23}$ is an integer of 0 or 1.

The aromatic diamine used during preparation of polyamic acid includes a compound selected from the group consisting of paraphenylenediamine (p-PDA), 4,4-methylene dianiline (MDA), 4,4-oxydianiline (ODA), metabisaminophenoxydiphenylsulfone (m-BAPS), parabisaminophenoxydiphenylsulfone (p-BAPS), 2,2-bis[(aminophenoxy)phenyl]propane (BAPP), 2,2-bisaminophenoxyphenylhexafluoropropane (HF-BAPP), 1,4-diamino-2-methoxybenzene, and combinations thereof, but is not limited thereto.

The divalent organic group derived from the aromatic diamine may be selected from the group consisting of compounds represented by the following Chemical Formulae 11 to 13, and combinations thereof.

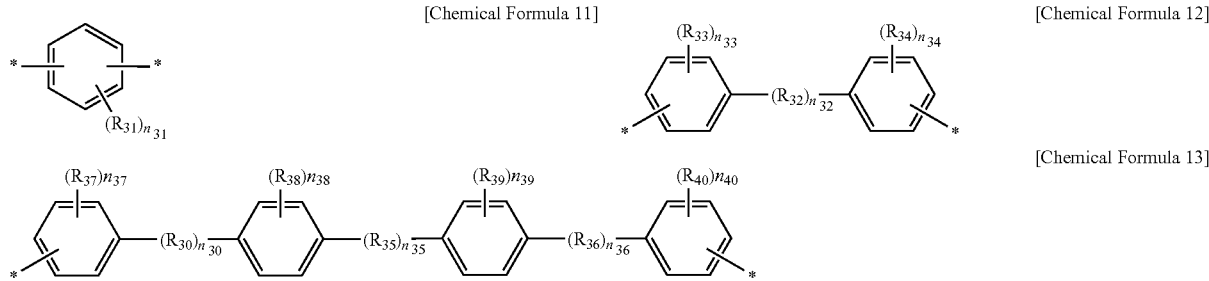

In the above Formulae 11 to 13:

$R_{31}$, $R_{33}$, $R_{34}$, and $R_{37}$ to $R_{40}$ are independently substituents selected from the group consisting of a substituted or unsubstituted C1 to C20 alkyl, a substituted or unsubstituted C1 to C30 aryl, and a substituted or unsubstituted C2 to C30 heteroaryl, and an alkyl, an aryl, and a heteroaryl including one selected from the group consisting of —O—, —COO—, —CONH—, —OCO— and combinations thereof;

$R_{30}$, $R_{32}$, $R_{35}$, and $R_{36}$ are independently substituents selected from the group consisting of O, $SO_2$, a C(R')(R") such as $C(CF_3)_2$ (where R' and R" are independently selected from the group consisting of hydrogen and a substituted or unsubstituted C1 to C6 alkyl);

$n_{31}$, $n_{33}$, $n_{34}$, and $n_{37}$ to $n_{40}$ are independently integers ranging from 0 to 4; and $n_{30}$, $n_{32}$, $n_{35}$, and $n_{36}$ are independently integers of 0 or 1.

The functional diamine used during preparation of polyamic acid causes a liquid crystal alignment film to control a pretilt angle of a liquid crystal molecule and provides polyamic acid with excellent alignment properties. The functional diamine is selected from the group consisting of compounds of the following Chemical Formulae 14 to 16. Herein, the polyamic acid includes a divalent organic group derived from the functional diamine.

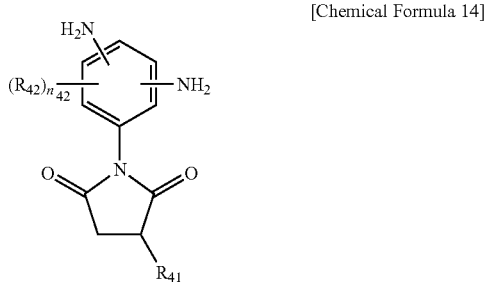

In the above Formula 14:

$R_{41}$ is hydrogen, a substituted or unsubstituted C1 to C20 alkyl, a substituted or unsubstituted C1 to C30 aryl, or a substituted or unsubstituted C2 to C30 heteroaryl, $R_{42}$ is a substituent selected from the group consisting of a substituted or unsubstituted C1 to C20 alkyl, a substituted or unsubstituted C1 to C30 aryl, and a substituted or unsubstituted C2 to C30 heteroaryl, and $n_{42}$ is an integer ranging from 0 to 3.

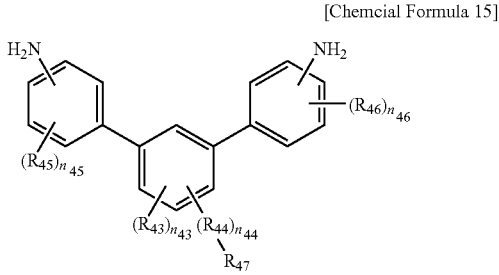

In the above Formula 15:

$R_{43}$, $R_{45}$, and $R_{46}$ are independently substituents selected from the group consisting of a substituted or unsubstituted C1 to C20 alkyl, a substituted or unsubstituted C1 to C30 aryl, and a substituted or unsubstituted C2 to, C30 heteroaryl;

$R_{44}$ is a substituent selected from the group consisting of O, COO, CONH, OCO, and a substituted or unsubstituted C1 to C10 alkylene;

$R_{47}$ is a substituent selected from the group consisting of hydrogen, a substituted or unsubstituted C1 to C20 alkyl, a substituted or unsubstituted C1 to C30 aryl, and a substituted or unsubstituted C2 to C30 heteroaryl, and an alkyl, an aryl, and a heteroaryl including one selected from the group consisting of —O—, —COO—, —CONH—, —OCO—, and combinations thereof;

$n_{43}$ is an integer of 0 or 3;

$n_{45}$ and $n_{46}$ are independently integers ranging from 0 to 4; and $n_{44}$ is an integer of 0 or 1.

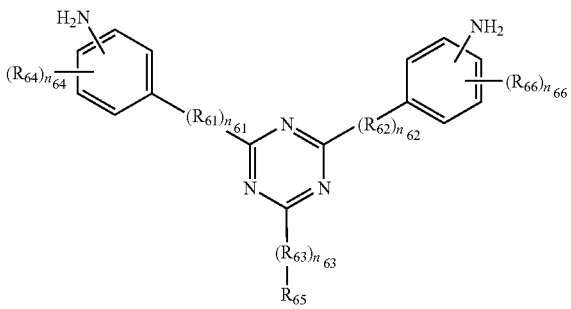

In the above Formula 16:

$R_{64}$ and $R_{66}$ are independently substituents selected from the group consisting of a substituted or unsubstituted C1 to C20 alkyl, a substituted or unsubstituted C1 to C30 aryl, and a substituted or unsubstituted C2 to C30 heteroaryl;

$R_{66}$ is a substituent selected from the group consisting of hydrogen, a substituted or unsubstituted C1 to C20 alkyl, a substituted or unsubstituted C1 to C30 aryl, and a substituted or unsubstituted C2 to C30 heteroaryl;

$R_{61}$ and $R_{62}$ are independently selected from the group consisting of O and COO;

$R_{63}$ is selected from the group consisting of O, COO, CONH, and OCO;

$n_{64}$ and $n_{66}$ are independently integers ranging from 0 to 4; and $n_{61}$ to $n_{63}$ are independently integers of 0 or 1.

The polyimide polymer of the above Formula 2 may be prepared by imidization of the polyamic acid of the above Formula 1. The imidization of the polyamic acid to obtain the polyimide polymer is well known in this art and therefore detailed description thereof is not provided.

The polyimide photopolymer of the above Formula 3 can be synthesized from at least one photodiamine, and an acid dianhydride selected from the group consisting of an aliphatic cyclic acid dianhydride, an aromatic acid dianhydride, and a combination thereof.

The copolymerization of the photodiamine and acid dianhydride to obtain a polyimide photopolymer is well known in this art, and therefore a detailed description thereof is not provided. The aliphatic cyclic acid dianhydride or aromatic acid dianhydride used during preparation of the polyimide photopolymer is the same as one used during preparation of the polyamic acid.

The photodiamine may be selected from the group consisting of a cumarin-based photodiamine, a chalcone-based photodiamine, a cinnamate-based photodiamine, and combinations thereof.

The cinnamate-based photodiamine may be selected from the group consisting of a compound of the following Formula 17, a compound of the following Formula 18, and combinations thereof. The chalcone-based photodiamine is preferably a compound of the following Formula 19. The cumarin-based photodiamine is preferably a compound of the following Formula 20.

[Chemical Formula 17]

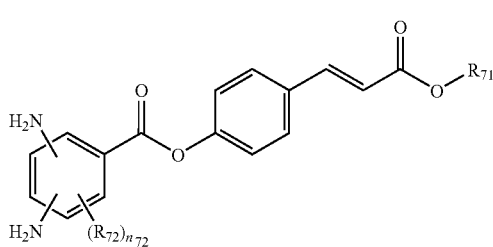

In the above Formula 17:

$R_{71}$ is selected from the group consisting of hydrogen, a substituted or unsubstituted C1 to C30 alkyl, a substituted or unsubstituted C6 to C30 aryl, and a substituted or unsubstituted C2 to C30 heteroaryl; and $R_{72}$ is selected from the group consisting of a substituted or unsubstituted C1 to C30 alkyl, a substituted or unsubstituted C6 to C30 aryl, and a substituted or unsubstituted C2 to C30 heteroaryl, and $n_{72}$ is an integer ranging from 0 to 3.

[Chemical Formula 18]

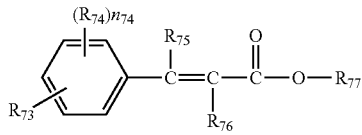

In the above Formula 18:

$R_{77}$ is selected from the group consisting of an aromatic diamine, a diamine including a substituted or unsubstituted linear or branched C1 to C24 alkylene, and combinations thereof;

the substituted alkylene of the $R_{77}$ is selected from the group consisting of a substituted alkylene where hydrogen is substituted with a substituent selected from the group consisting of a halogen and a cyano, a substituted alkylene where at least one of $CH_2$ groups not being adjacent to each other is substituted with a substituent selected from the group consisting of a substituted or unsubstituted C2 to C30 arylene, a substituted or unsubstituted C2 to C30 heteroarylene, a substituted or unsubstituted C3 to C30 cycloalkylene; a substituted or unsubstituted C2 to C30 heterocycloalkylene, —O—, —CO—, —CO—O—, —O—CO—, —Si(CH$_3$)$_2$—O—Si(CH$_3$)$_2$—, —NR'—, —NR'—CO—, —CO—NR'—, —NR'—CO—O—, —O—CO—NR'—, —NR'—, —CO—NR'—, —CH═CH—, —C≡C—, and —O—CO—O— (where R' is selected from the group consisting of hydrogen, and a substituted or unsubstituted C1 to C6 alkyl), and combinations thereof;

$R_{74}$ is a substituent selected from the group consisting of a substituted or unsubstituted C1 to C20 alkyl, a substituted or unsubstituted C1 to C30 aryl, and a substituted or unsubstituted C2 to C30 heteroaryl, and $n_{74}$ is an integer ranging from 0 to 4;

$R_{75}$ and $R_{76}$ are independently selected from the group consisting of hydrogen, a halogen, a cyano, and a substituted or unsubstituted C1 to C12 alkyl;

the substituted alkyls of the $R_{75}$ and $R_{76}$ are selected from the group consisting of a substituted alkyl where hydrogen is substituted with a substituent selected from the group consisting of halogen and a cyano, a substituted alkyl where at least one of $CH_2$ groups not being adjacent to each other is substituted with a substituent selected from the group consisting of —O—, —CO—O—, —O—CO—, and —CH═CH—, and combinations thereof, $R_{73}$ is selected from the group consisting of a substituted or unsubstituted C1 to C30 alkyl, a substituted or unsubstituted C7 to C30 alkylaryl, a substituted or unsubstituted C3 to C30 cycloalkyl, a substituted or unsubstituted pyrimidinyl, a substituted or unsubstituted pyridinyl, a substituted or unsubstituted thiophenyl, a substituted or unsubstituted furanyl, a substituted or unsubstituted naphthyl, and a substituted or unsubstituted phenyl;

the substituted alkyl of the $R_{73}$ is selected from the group consisting of a substituted alkyl where hydrogen is substituted with a substituent selected from the group consisting of halogen and a cyano, a substituted alkyl where at least one of $CH_2$ groups not being adjacent to each other is substituted with a substituent selected from the group consisting of —O—, —CO—O—, —O—CO—, and —CH═CH—, and combinations thereof; and the substituted alkylaryl of the $R_{73}$ is a substituted alkylaryl where at least one of $CH_2$ groups not being adjacent to each other is substituted with a substituent selected from the group consisting of —O—, —CO—O—, —O—CO—, and —CH═CH—, and combinations thereof.

[Chemical Formula 19]

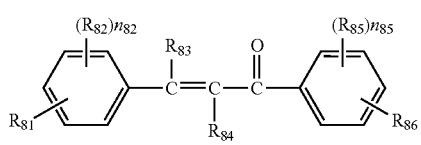

In the above Formula 19:

R$_{81}$ is selected from the group consisting of an aromatic diamine, a diamine including a substituted or unsubstituted linear or branched C1 to C24 alkylene, and combinations thereof;

the substituted alkylene of the R$_{81}$ is selected from the group consisting of a substituted alkylene where hydrogen is substituted with a substituent selected from the group consisting of a halogen and a cyano, a substituted alkylene where at least one of CH$_2$ groups not being adjacent to each other is substituted with a substituent selected from the group consisting of a substituted or unsubstituted C2 to C30 arylene, a substituted or unsubstituted C2 to C30 heteroarylene, a substituted or unsubstituted C3 to C30 cycloalkylene, a substituted or unsubstituted C2 to C30 heterocycloalkylene, —O—, —CO—, —CO—O—, —O—CO—, —Si(CH$_3$)$_2$—O—Si(CH$_3$)$_2$—, —NR'—, —NR'—CO—, —CO—NR'—, —NR'—CO—O—, —O—CO—NR'—, —NR'—, —CO—NR'—, —CH═CH—, —C≡C— and —O—CO—O— (where R' is selected from the group consisting of hydrogen, and a substituted or unsubstituted C1 to C6 alkyl), and combinations thereof;

R$_{82}$ and R$_{85}$ are substituents selected from the group consisting of a substituted or unsubstituted C1 to C20 alkyl, a substituted or unsubstituted C1 to C30 aryl, and a substituted or unsubstituted C2 to C30 heteroaryl, and n$_{82}$ and n$_{85}$ are integers ranging from 0 to 4;

R$_{83}$ and R$_{84}$ are independently selected from the group consisting of hydrogen, a halogen, a cyano, and a substituted or unsubstituted C1 to C12 alkyl;

the substituted alkyls of the R$_{83}$ and R$_{84}$ are selected from the group consisting of a substituted alkyl where hydrogen is substituted with a substituent selected from the group consisting of halogen and a cyano, a substituted alkyl where at least one of CH$_2$ groups not being adjacent to each other is substituted with a substituent selected from the group consisting of —O—, —CO—O—, —O—CO—, and —CH═CH—, and combinations thereof;

R$_{86}$ is selected from the group consisting of a substituted or unsubstituted C1 to C30 alkyl, a substituted or unsubstituted C7 to C30 alkylaryl, a substituted or unsubstituted C3 to C30 cycloalkyl, a substituted or unsubstituted pyrimidinyl, a substituted or unsubstituted pyridinyl, a substituted or unsubstituted thiophenyl, a substituted or unsubstituted furanyl, a substituted or unsubstituted naphthyl, and a substituted or unsubstituted phenyl;

the substituted alkyl of the R$_{86}$ is selected from the group consisting of a substituted alkyl where hydrogen is substituted with a substituent selected from the group consisting of a halogen and a cyano, a substituted alkyl where at least one of CH$_2$ groups not being adjacent to each other is substituted with a substituent selected from the group consisting of —O—, —CO—O—, —O—CO—, and —CH═CH—, and combinations thereof; and the substituted alkylaryl of the R$_{86}$ is a substituted alkylaryl where at least one of CH$_2$ groups not being adjacent to each other is substituted with a substituent selected from the group consisting of —O—, —CO—O—, —O—CO—, and —CH═CH—, and combinations thereof.

[Chemical Formula 20]

In the above Formula 20:

R$_{91}$ is selected from the group consisting of an aromatic diamine, a diamine including a substituted or unsubstituted linear or branched C1 to C24 alkylene, and combinations thereof;

the substituted alkylene of the R$_{91}$ is selected from the group consisting of a substituted alkylene where hydrogen is substituted with a substituent selected from the group consisting of a halogen and a cyano, a substituted alkylene where at least one of CH$_2$ groups not being adjacent to each other is substituted with a substituent selected from the group consisting of a substituted or unsubstituted C2 to C30 arylene, a substituted or unsubstituted C2 to C30 heteroarylene, a substituted or unsubstituted C3 to C30 cycloalkylene, a substituted or unsubstituted C2 to C30 heterocycloalkylene, —O—, —CO—, —CO—O—, —O—CO—, —Si(CH$_3$)$_2$—O—Si(CH$_3$)$_2$—, —NR'—, —NR'—CO—, —CO—NR'—, —NR'—CO—O—, —O—CO—NR'—, —NR'—, —CO—NR'—, —CH═CH—, —C≡C—, and —O—CO—O— (where R' is selected from the group consisting of hydrogen, and a substituted or unsubstituted C1 to C6 alkyl), and combinations thereof;

R$_{92}$ is a substituent selected from the group consisting of a substituted or unsubstituted C1 to C20 alkyl, a substituted or unsubstituted C1 to C30 aryl, and a substituted or unsubstituted C2 to C30 heteroaryl, and n$_{92}$ is an integer ranging from 0 to 4;

R$_{93}$ and R$_{94}$ are independently selected from the group consisting of hydrogen, a halogen, a cyano, and a substituted or unsubstituted C1 to C12 alkyl; and the substituted alkyls of the R$_{93}$ and R$_{94}$ are selected from the group consisting of a substituted alkyl where hydrogen is substituted with a substituent selected from the group consisting of a halogen and a cyano, a substituted alkyl where at least one of CH$_2$ groups not being adjacent to each other is substituted with a substituent selected from the group consisting of —O—, —CO—O—, —O—CO—, and —CH═CH—, and combinations thereof.

The liquid crystal alignment agent includes 1 to 90 parts by weight of the polyamic acid or 1 to 50 parts by weight of the polyimide polymer, and 0.001 to 90 parts by weight of the polyimide photopolymer. The liquid crystal alignment agent more preferably includes 1 to 90 parts by weight of the polyamic acid or 1 to 40 parts by weight of the polyimide polymer, and 1 to 60 parts by weight of the polyimide photopolymer.

When the liquid crystal alignment agent includes all of the polyamic acid, the polyimide polymer, and the polyimide photopolymer, the polyamic acid is included in an amount of 1 to 90 parts by weight, the polyimide polymer is included in an amount of 1 to 50 parts by weight, and the polyimide photopolymer is included in an amount of 0.001 to 90 parts by weight. Preferably, the polyamic acid is included in an amount of 1 to 90 parts by weight, the polyimide polymer is included in an amount of 1 to 40 parts by weight, and the polyimide photopolymer is included in an amount of 1 to 60 parts by weight.

When the liquid crystal alignment agent of the polyamic acid, the polyimide polymer, and the polyimide is added within the range, the after-image characteristics are particularly improved.

According to another embodiment of the present invention, provided is a liquid crystal photoalignment film that is provided by using the photoalignment agent of a liquid crystal.

The liquid crystal photoalignment film may be obtained by adding the photoalignment agent of a liquid crystal in a solvent to provide a composition, and coating the same on a substrate to provide a liquid crystal photoalignment film.

The solvent may include N-methyl-2-pyrrolidone, N,N-dimethyl acetamide, N,N-dimethyl formamide, dimethyl sulfoxide, γ-butyro lactone, and a phenol-based solvent such as a meta cresol, a phenol, a halogenated phenol, and the like.

In addition, the solvent may further include a poor solvent such as alcohol series, ketone series, ester series, ether series, hydrocarbon series, or halogenated hydrocarbon series solvents, as long as the soluble polyimide polymer is not deposited. The poor solvent lowers surface energy of a liquid crystal alignment agent and improves its spread and flatness when the liquid crystal alignment agent is coated.

The poor solvent may be included in an amount of 1 to 90 volume % based on the total amount of the solvent. In another embodiment, it may be included in an amount of 1 to 70 volume %.

Specific examples of the poor solvent include one selected from the group consisting of methanol, ethanol, isopropanol, cyclohexanol, ethylene glycol, propylene glycol, 1,4-butanediol, triethylene glycol, acetone, methylethylketone, cyclohexanone, methyl acetate, ethyl acetate, butyl acetate, diethyl hydroxide, malonic acid ester, diethyl ether, ethylene glycol monomethyl ether, ethylene glycol monoethyl ether, ethylene glycol phenyl ether, ethylene glycol phenyl methyl ether, ethylene glycol phenyl ethyl ether, ethylene glycol dimethylethyl, diethylene glycol dimethylethyl, diethylene glycol ether, diethylene glycol monomethyl ether, diethylene glycol monoethyl ether, diethylene glycol monomethyl ether acetate, diethylene glycol monoethyl ether acetate, ethylene glycol methyl ether acetate, ethylene glycol ethyl ether acetate, 4-hydroxy-4-methyl-2-pentanone, 2-hydroxy ethyl propionate, 2-hydroxy-2-methyl ethyl propionate, ethoxy ethyl acetate, hydroxy ethyl acetate, 2-hydroxy-3-methyl butanoic acid methyl, 3-methoxy methyl propionate, 3-methoxy ethyl propionate, 3-ethoxy ethyl propionate, 3-ethoxy methyl propionate, methyl methoxy butanol, ethyl methoxy butanol, methyl ethoxy butanol, ethyl ethoxy butanol, tetrahydrofuran, dichloromethane, 1,2-dichloroethane, 1,4-dichloro butane, trichloro ethane, chlorobenzene, o-dichlorobenzene, hexane, heptane, octane, benzene, toluene, xylene, and combinations thereof.

The amount of solvent is not limited in the composition for forming a liquid crystal photoalignment film, but according to one embodiment of the present invention, the solid amount of the photoalignment agent of a liquid crystal ranges from 1 to 30 wt %; in another embodiment, it ranges from 3 to 15 wt %; and in a further embodiment, it ranges from 5 to 10 wt %. When the solid amount is less than 1 wt %, it may cause problems in that the film is affected by the printing process so that the film uniformity is deteriorated; on the other hand, when it is more than 30 wt %, the film uniformity is deteriorated and the transmittance is deteriorated due to the high viscosity during the printing process.

The composition for forming a liquid crystal photoalignment film may include more than one epoxy compound having 2 to 4 epoxy functional groups to improve reliability and electro-optical characteristics. The epoxy compound may be included in an amount of 0.01 to 50 parts by weight based on 100 parts by weight of the liquid crystal photoalignment agent. In another embodiment, it may be included in an amount of 1 to 30 parts by weight. When it is included in an amount of 50 parts by weight or more, it may deteriorate printability or flatness. When it is included in an amount of 0.01 parts by weight, it may have little effects of an epoxy compound.

Specific examples of the epoxy compound include N,N,N',N'-tetraglycidyl-4,4'-diaminophenylmethane (TGDDM), N,N,N',N'-tetraglycidyl-4,4'-diaminophenylethane, N,N,N',N'-tetraglycidyl-4,4'-diaminophenylpropane, N,N,N',N'-tetraglycidyl-4,4'-diaminophenylbutane, N,N,N',N'-tetraglycidyl-4,4'-diaminobenzene, and so on, but it is not limited thereto.

The composition for forming a liquid crystal photoalignment film can further include a silane coupling agent or a surfactant to improve adherence to a substrate, and flatness and coating characteristics.

The composition for forming a liquid crystal photoalignment film is coated on a substrate to form a liquid crystal photoalignment film. The composition for forming a liquid crystal photoalignment film can be coated in a method such as spin coating, flexo printing, Inkjet printing, and the like. The flexo printing can accomplish excellent uniformity of a film and may easily form a larger liquid crystal photoalignment film.

The substrate has no particular limit, but may include a glass substrate or a plastic substrate such as an acryl substrate or a polycarbonate substrate, as long as it is transparent. In addition, it may include a substrate including an ITO electrode and the like for liquid crystal operation in terms of simplifying a manufacturing process.

In order to improve uniformity of a film, the composition for forming a liquid crystal photoalignment film may be uniformly coated on a substrate and predried at room temperature to 200° C., 30 to 150° C., or 40 to 120° C., for 1 to 100 minutes. The predrying can control volatility of each component of the liquid crystal alignment agent, securing a uniform film without a thickness deviation.

Then, it is fired at a temperature of 80 to 300° C. or 120 to 280° C. for 5 to 300 minutes to completely evaporate a solvent, fabricating a liquid crystal alignment film.

The liquid crystal alignment film can be used for a liquid crystal display with uniaxial alignment treatment by polarized ultraviolet (UV) rays or rubbing, or without the uniaxial alignment treatment for some uses such as a vertical alignment film and the like.

The liquid crystal photoalignment film according to one embodiment of the present invention can be subjected to uniaxial alignment treatment by exposing to light with energy of 10 mJ to 5000 mJ for 0.1 to 180 minutes. As mentioned above, the uniaxial alignment treatment can be performed with a reduced exposure intensity so as to completely remove double bonds included in the polyimide photopolymer.

According to a further embodiment of the present invention, provided is a display device including the liquid crystal photoalignment film. In another embodiment, the display device is a liquid crystal display (LCD).

FIG. 1 is a cross-sectional view showing a liquid crystal display (LCD) according to one embodiment of the present invention.

As shown in FIG. 1, the liquid crystal display (LCD) 1 according to one embodiment of the present invention includes a lower panel 100, an upper panel 200, and a liquid crystal layer 3.

In the lower panel 100, a gate conductor including a plurality of gate lines (not shown) and a plurality of storage electrodes 133 is formed on a front surface of a first substrate 110. On the gate conductor, a gate insulating layer 140, a plurality of semiconductors 154, a plurality of pairs of ohmic contacts 163 and 165, a plurality of source electrodes 173, and a plurality of drain electrodes 175 are sequentially formed.

One thin film transistor (TFT) consists of one gate electrode 124, one source electrode 173, and one drain electrode 175 together with a semiconductor 154.

A passivation layer 180 is formed on the exposed portion of the semiconductor 154, the source electrode 173, the drain electrode 175, and the gate insulating layer 140. On the passivation layer 180, a plurality of pixel electrodes 191 are formed.

Hereinafter, the upper panel 200 is described.

In the upper panel 200, a light blocking member 220 is formed on a second substrate 210. A plurality of color filters 230 is formed on the second substrate 210 and the light blocking member 220, and an overcoat 250 is formed on the color filter 230. The overcoat 250 is to prevent the color filter 230 from being exposed to the liquid crystal layer 3, and the overcoat 250 can be omitted.

A first liquid crystal photoalignment film 12 is formed on the surface of the pixel electrode 191 of the lower panel 100, and a second liquid crystal photoalignment film 22 is formed on the surface of a common electrode 270 of the upper panel 200. The first liquid crystal photoalignment film 12 and the second liquid crystal photoalignment film 22 are fabricated by using the photoalignment agent of a liquid crystal according to one embodiment of the present invention.

Even though the liquid crystal photoalignment films 12 and 22 are shown to be respectively formed on the lower panel 100 and the upper panel 200 in FIG. 1, the liquid crystal photoalignment film 12 or 22 may be formed in either the upper panel 200 or the lower panel 100.

The following examples illustrate the present invention in more detail. These examples, however, should not in any sense be interpreted as limiting the scope of the present invention.

Indeed, descriptions that are not included in this specification are omitted because they can be easily understood by one having ordinary skill in the art without any difficulties.

Preparation Example 1

Preparation of Polyamic Acid (PAA-1)

0.7 moles of phenylenediamine and 0.3 moles of functional diamine 3,5-diaminophenyldecyl succinimide of the following Chemical Formula 21 were introduced into a four-necked flask mounted with an agitator, a temperature controller, a nitrogen gas injector, and a cooler while flowing nitrogen therethrough, and N-methyl-2-pyrrolidone (NMP) was added thereto to provide a mixed solution.

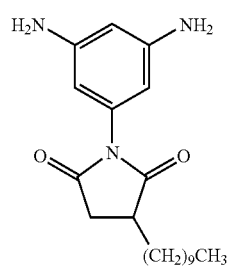

[Chemical Formula 21]

1.0 mole of solid 1,2,3,4-cyclobutanetetracarboxylic acid dianhydride was added to the mixed solution and vigorously agitated. The solid amount was 20 wt %. The reaction was performed while maintaining the temperature between 30° C. and 50° C. for 10 hours to provide a polyamic acid resin. To the provided polyamic acid resin, a mixed organic solvent of N-methyl-2-pyrrolidone and γ-butyrolactone was added and agitated at room temperature for 24 hours to provide a polyamic acid solution (PAA-1).

Preparation Example 2

Preparation of Polyamic Acid (PAA-2)

A polyamic acid solution (PAA-2) was prepared in accordance with the same procedure as in Preparation Example 1, except that the functional diamine represented by the following Chemical Formula 22 was used instead of the functional diamine represented by Chemical Formula 21.

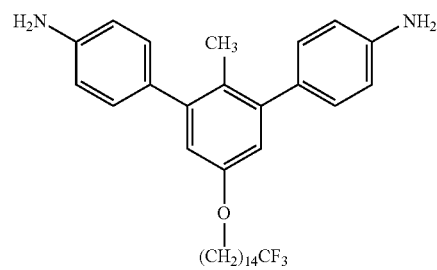

[Chemical Formula 22]

Preparation Example 3

Preparation of Polyamic Acid (PAA-3)

A polyamic acid solution (PAA-3) was prepared in accordance with the same procedure as in Preparation Example 1, except that the functional diamine represented by the following Chemical Formula 23 was used instead of the functional diamine represented by Chemical Formula 21.

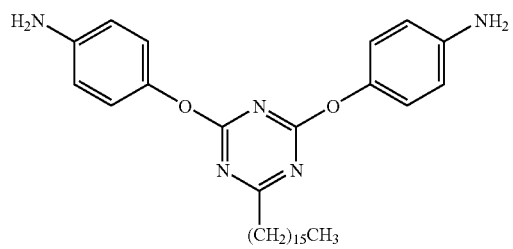

[Chemical Formula 23]

Preparation Example 4

Preparation of Polyimide a Polymer (SPI-1)

0.8 moles of phenylenediamine and 0.2 moles of diamine 3,5-diaminophenyldecyl succinimide represented by Chemical Formula 21 were introduced into a four-neck flask mounted with an agitator, a temperature controller, a nitrogen gas injector, and a cooler while flowing nitrogen therethrough, and N-methyl-2-pyrrolidone was added thereto to provide a mixed solution.

To the mixed solution, 1.0 mole of solid 1,2,3,4-cyclobutanetetracarboxylic acid dianhydride was introduced and vigorously agitated. The solid amount was 20 wt %. The reaction was performed while maintaining the temperature within 30° C. to 50° C. for 10 hours to provide a polyamic acid solution.

After 3.0 moles of acetic acid anhydride and 5.0 moles of pyridine were added to the obtained polyamic acid solution and the temperature was increased to 80° C., it was reacted for 6 hours, and the catalyst and the solvent were removed through vacuum distillation to provide a soluble polyimide resin having a solid amount of 20%.

To the obtained soluble polyimide resin, a mixed organic solvent of N-methyl-2-pyrrolidone and γ-butyrolactone was added and agitated at room temperature for 24 hours to provide a soluble polyimide resin (SPI-1).

Preparation Example 5

Preparation of Polyimide a Polymer (SPI-2)

A soluble polyimide resin (SPI-2) was prepared in accordance with the same procedure as in Preparation Example 4, except that the functional diamine represented by the following Chemical Formula 22 was used instead of the functional diamine represented by Chemical Formula 21.

Preparation Example 6

Preparation of Polyimide a Polymer (SPI-3)

A soluble polyimide resin (SPI-3) was prepared in accordance with the same procedure as in Preparation Example 4, except that the functional diamine represented by the following Chemical Formula 23 was used instead of the functional diamine represented by Chemical Formula 21.

Preparation Example 7

Preparation of Polyimide Photopolymer (PSPI-1)

0.5 moles of phenylenediamine and 0.5 moles of diamino benzoic acid 4-(2-ethoxycarbonyl-vinyl)-phenyl ester represented by the following Chemical Formula 24 were introduced into a four-neck flask mounted with an agitator, a temperature controller, a nitrogen gas injector, and a cooler while flowing nitrogen therethrough under a dark room condition, and N-methyl-2-pyrrolidone was added thereto to provide a mixed solution.

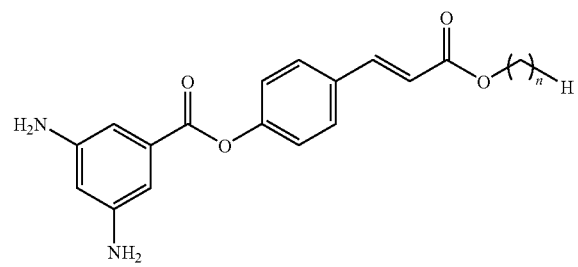

[Chemical Formula 24]

In the above Formula 24, n=2.

To the mixed solution, 1.0 mole of solid 1,2,3,4-cyclobutanetetracarboxylic acid dianhydride was added and vigorously agitated. The solid amount was 20 wt %. The reaction was performed while maintaining the temperature between 30° C. and 80° C. for 24 hours to provide a polyamic acid solution.

After 3.0 moles of acetic acid anhydride and 5.0 moles of pyridine were added to the obtained polyamic acid solution and the temperature was increased to 80° C., the reaction was performed for 6 hours, and the catalyst and the solvent were removed with vacuum distillation to provide a soluble polyimide photopolymer having a solid amount of 20%.

To the obtained soluble polyimide photopolymer, a mixed organic solvent of N-methyl-2-pyrrolidone and γ-butyrolactone was added and agitated at room temperature for 24 hours to provide a soluble photoalignment polyimide resin (PSPI-1).

Preparation Example 8

Preparation of Polyimide Photopolymer (PSPI-2)

A photoalignment polyimide resin (PSPI-2) was prepared in accordance with the same procedure as in Preparation Example 7, except that 1.0 mole of compound represented by Chemical Formula 24 was used.

Preparation Example 9

Preparation of Polyimide Photopolymer (PSPI-3)

A photoalignment polyimide resin (PSPI-3) was prepared in accordance with the same procedure as in Preparation Example 7, except that 1.0 mole of the compound represented by Chemical Formula 25 was used instead of the compound represented by Chemical Formula 24.

[Chemical Formula 25]

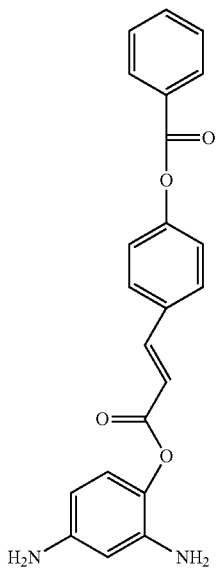

Preparation Example 10

Preparation of Polyimide Photopolymer (PSPI-4)

A photoalignment polyimide resin (PSPI-4) was prepared in accordance with the same procedure as in Preparation Example 7, except that 1.0 mole of the compound represented by Chemical Formula 26 was used instead of the compound represented by Chemical Formula 24.

[Chemical Formula 26]

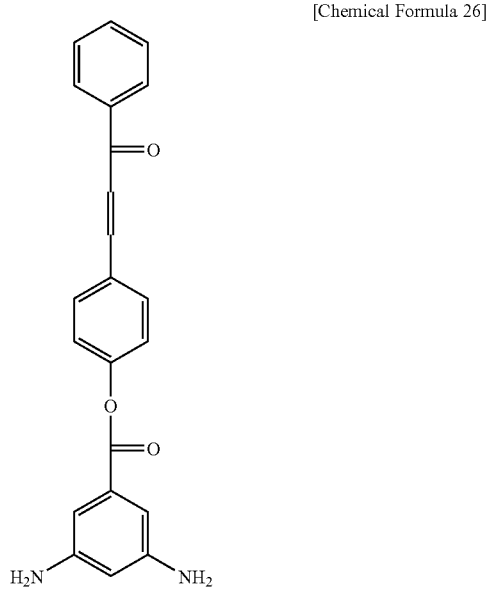 [SMILES: Nc1cc(N)cc(C(=O)Oc2ccc(C=CC(=O)c3ccccc3)cc2)c1]

Preparation Example 11

Preparation of Polyimide Photopolymer (PSPI-5)

A photoalignment polyimide resin (PSPI-5) was prepared in accordance with the same procedure as in Preparation Example 7, except that 1.0 mole of the compound represented by Chemical Formula 27 was used instead of the compound represented by Chemical Formula 24.

[Chemical Formula 27]

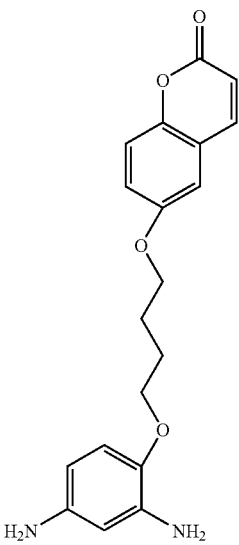

Preparation of Liquid Crystal Photo-alignment Film

Example 1

10 g of a PSPI-1 solution having a solid amount of 8 wt % obtained from Preparation Example 7 was introduced into 70 g of a PAA-1 solution having a solid amount of 8 wt % obtained from Preparation Example 1, agitated while flowing nitrogen for 24 hours, then filtered though a filter having a sieve size of 0.1 μm to provide a photoalignment agent of a liquid crystal (hereinafter referred to as PAA/PSPI-1) having a solid amount of 8 wt %.

Example 2

10 g of a PSPI-1 solution having a solid amount of 8 wt % obtained from Preparation Example 7 was introduced into 20 g of an SPI-1 solution having a solid amount of 8 wt % obtained from Preparation Example 4, agitated while flowing nitrogen for 24 hours, then filtered though a filter having a sieve size of 0.1 μm to provide a photoalignment agent of a liquid crystal (hereinafter referred to as SPI/PSPI-1) having a solid amount of 8 wt.

Example 3

20 g of an SPI-1 solution having a solid amount of 8 wt % obtained from Preparation Example 4 and 10 g of a PSPI-1 solution having a solid amount of 8 wt % obtained from Preparation Example 7 were introduced into 70 g of a PAA-1 solution having a solid amount of 8 wt % obtained from Preparation Example 1, agitated while flowing nitrogen for 24 hours, then filtered though a filter having a sieve size of 0.1 μm to provide a photoalignment agent of a liquid crystal (hereinafter referred to as PAA/SPI/PSPI-1) having a solid amount of 8 wt %.

Example 4

20 g of an SPI-1 solution having a solid amount of 8 wt % obtained from Preparation Example 4 and 30 g of a PSPI-1 solution having a solid amount of 8 wt % obtained from Preparation Example 7 were introduced into 50 g of a PAA-1 solution having a solid amount of 8 wt % obtained from Preparation Example 1, agitated while flowing nitrogen for 24 hours, then filtered though a filter having a sieve size of 0.1 µm to provide a photoalignment agent of a liquid crystal (hereinafter referred to as PAA/SPI/PSPI-2) having a solid amount of 8 wt %.

Example 5

20 g of an SPI-1 solution having a solid amount of 8 wt % obtained from Preparation Example 4 and 50 g of a PSPI-1 solution having a solid amount of 8 wt % obtained from Preparation Example 7 were introduced into 30 g of a PAA-1 solution having a solid amount of 8 wt % obtained from Preparation Example 1, agitated while flowing nitrogen for 24 hours, then filtered though a filter having a sieve size of 0.1 µm to provide a photoalignment agent of a liquid crystal (hereinafter referred to as PAA/SPI/PSPI-3) having a solid amount of 8 wt %.

Example 6

20 g of an SPI-1 solution having a solid amount of 8 wt % obtained from Preparation Example 4 and 70 g of a PSPI-1 solution having a solid amount of 8 wt % obtained from Preparation Example 7 were introduced into 10 g of a PAA-1 solution having a solid amount of 8 wt % obtained from Preparation Example 1, agitated while flowing nitrogen for 24 hours, then filtered though a filter having a sieve size of 0.1 µm to provide a photoalignment agent of a liquid crystal (hereinafter referred to as PAA/SPI/PSPI-4) having a solid amount of 8 wt %.

Example 7

20 g of an SPI-1 solution having a solid amount of 8 wt % obtained from Preparation Example 4 and 10 g of a PSPI-2 solution having a solid amount of 8 wt % obtained from Preparation Example 8 were introduced into 70 g of a PAA-1 solution having a solid amount of 8 wt % obtained from Preparation Example 1, agitated while flowing nitrogen for 24 hours, then filtered though a filter having a sieve size of 0.1 µm to provide a photoalignment agent of a liquid crystal (hereinafter referred to as PAA/SPI/PSPI-5) having a solid amount of 8 wt %.

Example 8

20 g of an SPI-1 solution having a solid amount of 8 wt % obtained from Preparation Example 4 and 30 g of a PSPI-2 solution having a solid amount of 8 wt % obtained from Preparation Example 8 were introduced into 50 g of a PAA-1 solution having a solid amount of 8 wt % obtained from Preparation Example 1, agitated while flowing nitrogen for 24 hours, then filtered though a filter having a sieve size of 0.1 µm to provide a photoalignment agent of a liquid crystal (hereinafter referred to as PAA/SPI/PSPI-6) having a solid amount of 8 wt %.

Example 9

20 g of an SPI-1 solution having a solid amount of 8 wt % obtained from Preparation Example 4 and 50 g of a PSPI-2 solution having a solid amount of 8 wt % obtained from Preparation Example 8 were introduced into 30 g of a PAA-1 solution having a solid amount of 8 wt % obtained from Preparation Example 1, agitated while flowing nitrogen for 24 hours, then filtered though a filter having a sieve size of 0.1 µm to provide a photoalignment agent of a liquid crystal (hereinafter referred to as PAA/SPI/PSPI-7) having a solid amount of 8 wt %.

Example 10

20g of an SPI-1 solution having a solid amount of 8 wt % obtained from Preparation Example 4 and 70 g of a PSPI-2 solution having a solid amount of 8 wt % obtained from Preparation Example 8 were introduced into 10 g of a PAA-1 solution having a solid amount of 8 wt % obtained from Preparation Example 1, agitated while flowing nitrogen for 24 hours, then filtered though a filter having a particle diameter of 0.1 µm to provide a photoalignment agent of a liquid crystal (hereinafter referred to as PAA/SPI/PSPI-8) having a solid amount of 8 wt %.

Comparative Example 1

The photoalignment solution (PSPI-1) having a solid amount of 8 wt % obtained from Preparation Example 7 was filtered with a 0.1 µm filter to provide a photoalignment agent of a liquid crystal having a solid amount of 8 wt %.

Comparative Example 2

The photoalignment solution (PSPI-2) having a solid amount of 8 wt % obtained from Preparation Example 8 was filtered with a 0.1 µm filter to provide a photoalignment agent of a liquid crystal having a solid amount of 8 wt %.

Comparative Example 3

The photoalignment solution (PSPI-3) having a solid amount of 8 wt % obtained from Preparation Example 9 was filtered with a 0.1 µm filter to provide a photoalignment agent of a liquid crystal having a solid amount of 8 wt %.

Comparative Example 4

The photoalignment solution (PSPI-4) having a solid amount of 8 wt % obtained from Preparation Example 10 was filtered with a 0.1 µm filter to provide a photoalignment agent of a liquid crystal having a solid amount of 8 wt %.

Comparative Example 5

The photoalignment solution (PSPI-5) having a solid amount of 8 wt % obtained from Preparation Example 11 was filtered with a 0.1 µm filter to provide a photoalignment agent of a liquid crystal having a solid amount of 8 wt %.

(Printability of Liquid Crystal Photo-Alignment Film)

Each of crystal liquid alignment agents obtained from Examples 1 to 8 and Comparative Examples 1 and 2 was coated on an ITO substrate having a size of 10 cm x 10 cm under a certain condition in a uniform thickness of 0.1 µm in accordance with a spin coating method, and solvent was removed on a hot plate at a temperature of 70° C. Then it was cured at a temperature of 210° C. to provide a liquid crystal photoalignment film.

The obtained liquid crystal alignment films were observed for the diffusion characteristic and the rolling characteristic via the naked eye and an optical microscope to determine the printability of the photoalignment agent of a liquid crystal. The results of the printability determination are shown in the following Table 1.

(Liquid Crystal Alignment Properties of Liquid Crystal Photo-Alignment Film)

A liquid crystal cell was fabricated to determine liquid crystal alignment properties of a photoalignment agent of a liquid crystal. The liquid crystal cell was fabricated by the following processes An ITO glass substrate having a standardized size was patterned via photolithography in order to produce 1.5 cm×1.5 cm ITO substrates with an ITO electrode for applying a voltage.

Each of photoalignment agents of a liquid crystal obtained from Examples 1 to 8 and Comparative Examples 1 and 2 was coated on a patterned ITO substrate at a thickness of 0.1 μm by spin coating and cured at 70° C. and 210° C.

Two of the cured ITO substrates were exposed at a certain angle by a certain energy with an exposer (UIS-S2021J7-YD01, Ushio LPUV), placed in opposite directions to each other (for VA mode, 90 degree) to arrange the square ITO shape of the top to correspond to that of the bottom, and joined while maintaining a cell gap of 4.75 μm. The light source for exposure was a 2 kW deep UV ramp (UXM-2000).

The obtained cell was filled with liquid crystal, and the liquid crystal alignment properties were observed with a perpendicularly-polarized optical microscope. The results are shown in the following Table 1.

(Pretilt Angle of Liquid Crystal Photo-Alignment Film)

In order to observe the pretilt angle, a separate liquid crystal cell was fabricated to maintain a cell gap of 50 μm.

The liquid crystal cell having a cell gap of 50 μm was fabricated and measured by a crystal rotation method to determine the pretilt angle for the liquid crystal alignment agents obtained Example 1 to 8, Comparative Example 1, and Comparative Example 2. The results of measuring the pretilt angle are shown in the following Table 1.

(Electrical Characteristic and Optical Characteristic of Liquid Crystal Photo-Alignment Film)

The electrical characteristic and the optical characteristic of the liquid crystal photoalignment films having a cell gap of 4.75 μm were measured to determine a voltage-transmission curved line, a voltage holding ratio, and a residual DC voltage.

The voltage-transmission curved line, the voltage holding ratio, and the electrical and optical characteristics of residual DC-voltage are briefly described as follows.

The voltage-transmission curved line is one of the important electrical and optical characteristics, and one determining the driving voltage for a liquid crystal display (LCD). This is a standardized curve by considering the quantity of light of the brightest state as 100%, and the quantity of light of the darkest state as 0% when a voltage is applied to the liquid crystal cell for measuring the transmission.

The voltage holding ratio is determined as a degree at which the floating liquid crystal layer (with the external electric source) maintains the charged voltage for an unselected period in an active matrix TFT-LCD. The value is more ideal as it approaches 100%.

The residual DC voltage indicates a voltage that is applied to the liquid crystal layer when the external voltage is not applied, due to the ionized impurities of the liquid crystal layer that are absorbed on the alignment film. The value is more ideal as it becomes lower. The common method of measuring the residual DC voltage includes a method using flicker and a method using an electrical capacity changing curved line (C-V) of the liquid crystal layer depending upon the DC voltage.

The results of the electrical and optical characteristics of the liquid crystal photoalignment film using the liquid crystal cell are shown in the following Table 2.

TABLE 1

| Material | Printability | Vertical alignment properties | Photo-alignment properties | Pretilt angle (°) |
|---|---|---|---|---|
| Example 1 | good | good | good | 89.86 |
| Example 2 | good | good | good | 89.91 |
| Example 3 | good | good | good | 89.94 |
| Example 4 | good | good | good | 89.88 |
| Example 5 | good | good | good | 89.91 |
| Example 6 | good | good | good | 89.95 |
| Example 7 | good | good | good | 89.88 |
| Example 8 | good | good | good | 89.90 |
| Comparative Example 1 | good | good | good | 89.89 |
| Comparative Example 2 | good | good | good | 89.90 |

TABLE 2

| Material | Voltage-transmission | Voltage holding ratio (%) Room temperature 25° C. | Voltage holding ratio (%) High temperature 60° C. | Residual DC (by C-V) |
|---|---|---|---|---|
| Example 1 | good | 99.53 | 99.36 | 48 |
| Example 2 | good | 99.55 | 99.32 | 46 |
| Example 3 | good | 99.51 | 99.28 | 51 |
| Example 4 | good | 99.52 | 99.26 | 45 |
| Example 5 | good | 99.48 | 99.18 | 60 |
| Example 6 | good | 99.51 | 99.16 | 58 |
| Example 7 | good | 99.56 | 99.15 | 61 |
| Example 8 | good | 99.47 | 99.12 | 55 |
| Comparative Example 1 | good | 98.51 | 97.31 | 332 |
| Comparative Example 2 | good | 98.38 | 97.08 | 401 |

Referring to Table 1, it is indicated that the photoalignment agents of a liquid crystal according to Examples 1 to 8 had sufficient printability, vertical alignment properties, photo-alignment properties, and pretilt angle to be used in a liquid crystal photoalignment film.

Referring to Table 2, the photoalignment agents of a liquid crystal according to Examples 1 to 8 had good voltage-transmission, and a voltage holding ratio of 99% or more. On the other hand, the voltage holding ratio of the photoalignment agents of a liquid crystal according to Comparative Examples 1 and 2 did not reach 99%.

Furthermore, the photoalignment agents of a liquid crystal obtained from Examples 1 to 8 had low residual DC, while the photoalignment agents of a liquid crystal obtained from Comparative Examples 1 and 2 had relatively high residual DC.

The voltage holding ratio and the residual DC are references for determining the after-image characteristics of the liquid crystal photoalignment film. The after-image characteristics can be improved as the voltage holding ratio becomes higher and the residual DC becomes lower. Accordingly, the photoalignment agents of a liquid crystal obtained from Examples 1 to 8 had better after-image characteristics than those of the liquid crystal photoalignment agents obtained from Comparative Examples 1 and 2.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal photoalignment agent comprising:
   a compound selected from the group consisting of polyamic acid represented by the following Chemical Formula 1, polyimide polymers represented by the following Chemical Formula 2, and combinations thereof; and
   a polyimide photopolymer represented by the following Chemical Formula 3,

[Chemical Formula 1]

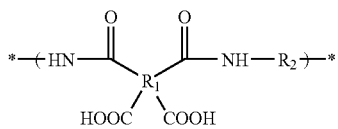

[Chemical Formula 2]

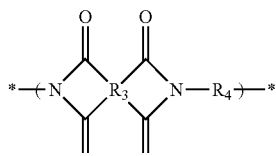

[Chemical Formula 3]

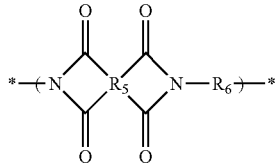

wherein, in the above Formulae 1 to 3, $R_1$, $R_3$, and $R_5$ are independently a quadrivalent organic group derived from an acid dianhydride selected from the group consisting of aliphatic cyclic acid dianhydrides and aromatic acid dianhydrides, $R_2$ and $R_4$ are independently a divalent organic group derived from an aromatic diamine, and $R_6$ is a divalent organic group derived from a photodiamine selected from the group consisting of cumarin-based photodiamines, chalcone-based photodiamines, and cinnamate-based photodiamines.

2. The liquid crystal photoalignment agent of claim 1, wherein the aliphatic cyclic acid dianhydride is selected from the group consisting of 1,2,3,4-cyclobutanetetracarboxylic acid dianhydride (CBDA), 5-(2,5-dioxotetrahydrofuryl)-3-methylcyclohexene-1,2-dicarboxylic acid anhydride (DOCDA), bicyclooctene-2,3,5,6-tetracarboxylic acid dianhydride (BODA), 1,2,3,4-cyclopentanetetracarboxylic acid dianhydride (CPDA), 1,2,4,5-cyclohexanetetracarboxylic acid dianhydride (CHDA), 1,2,4-tricarboxyl-3-methylcarboxyl cyclopentane dianhydride, 1,2,3,4-tetracarboxyl cyclopentane dianhydride, and combinations thereof.

3. The liquid crystal photoalignment agent of claim 1, wherein $R_1$, $R_3$, and $R_5$ are independently selected from the group consisting of compounds represented by the following Chemical Formulae 4 to 8, and combinations thereof:

[Chemical Formula 4]

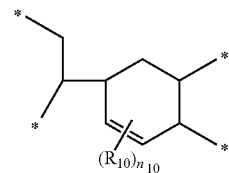

[Chemical Formula 5]

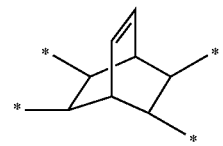

[Chemical Formula 6]

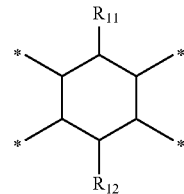

[Chemical Formula 7]

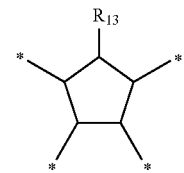

[Chemical Formula 8]

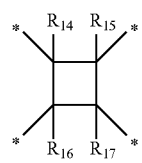

wherein, in the above Formulae 4 to 8, $R_{10}$ is selected from the group consisting of substituted or unsubstituted C1 to C20 alkyl, substituted or unsubstituted C1 to C30 aryl, and substituted or unsubstituted C2 to C30 heteroaryl, and $n_{10}$ is an integer ranging from 0 to 3, and $R_{11}$ to $R_{17}$ are independently selected from the group consisting of hydrogen, substituted or unsubstituted C1 to C20 alkyl, substituted or unsubstituted C1 to C30 aryl, and substituted or unsubstituted C2 to C30 heteroaryl.

4. The liquid crystal photoalignment agent of claim 1, wherein the aromatic acid dianhydride is selected from the group consisting of pyromellitic acid dianhydride (PMDA), biphthalic acid dianhydride (BPDA), oxydiphthalic acid dianhydride (ODPA), benzophenone tetracarboxylic acid dianhydride (BTDA), hexafluoroisopropylidene diphthalic acid dianhydride (6-FDA), and combinations thereof.

5. The liquid crystal photoalignment agent of claim 1, wherein $R_1$, $R_3$, and $R_5$ are independently selected from the group consisting of compounds represented by the following Formula 9, compounds represented by the following Formula 10, and combinations thereof:

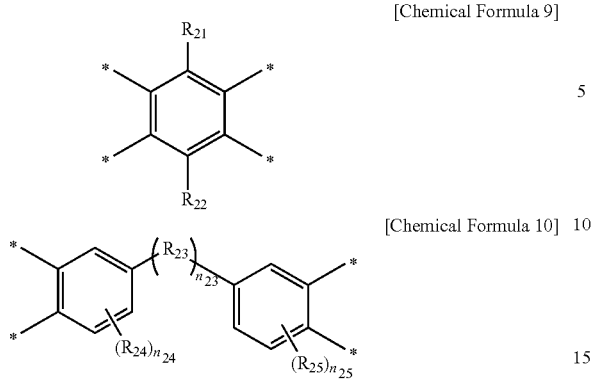

[Chemical Formula 9]

[Chemical Formula 10]

wherein, in the above Formulae 9 and 10, $R_{21}$ and $R_{22}$ are independently selected from the group consisting of hydrogen, substituted or unsubstituted C1 to C20 alkyl, substituted or unsubstituted C1 to C30 aryl, and substituted or unsubstituted C2 to C30 heteroaryl, $R_{24}$ and $R_{25}$ are independently selected from the group consisting of substituted or unsubstituted C1 to C20 alkyl, substituted or unsubstituted C1 to C30 aryl, and substituted or unsubstituted C2 to C30 heteroaryl, and $n_{24}$ and $n_{25}$ are independently integers ranging from 0 to 3, and $R_{23}$ is selected from the group consisting of O, CO, substituted or unsubstituted C1 to C6 alkylene substituted or unsubstituted C3 to C30 cycloalkylene, and substituted or unsubstituted C2 to C30 heterocycloalkylene, and $n_{23}$ is an integer of 0 or 1.

6. The liquid crystal photoalignment agent of claim 1, wherein the aromatic diamine is selected from the group consisting of paraphenylenediamine (p-PDA), 4,4-methylene dianiline (MDA), 4,4-oxydianiline (ODA), metabisaminophenoxydiphenylsulfone (m-BAPS), parabisaminophenoxydiphenylsulfone (p-BAPS), 2,2-bis[(aminophenoxy) phenyl]propane (BAPP), 2,2-bisaminophenoxyphenylhexafluoropropane (HF-BAPP), 1,4-diamino-2-methoxybenzene, and combinations thereof.

7. The liquid crystal photoalignment agent of claim 1, wherein $R_2$ and $R_4$ are independently selected from the group consisting of compounds represented by the following Chemical Formulae 11 to 13, and combinations thereof:

wherein, in the above Formulae 11 to 13, $R_{31}$, $R_{33}$, $R_{34}$, and $R_{37}$ to $R_{40}$ are independently selected from the group consisting of substituted or unsubstituted C1 to C20 alkyl, substituted or unsubstituted C1 to C30 aryl, substituted or unsubstituted C2 to C30 heteroaryl, and alkyl, aryl, and heteroaryl substituted with —O—, —COO—, —CONH—, —OCO—, or a combination thereof, $R_{30}$, $R_{32}$, $R_{35}$, and $R_{36}$ are independently selected from the group consisting of O, $SO_2$, and C(R')(R''), wherein R' and R'' are independently selected from the group consisting of hydrogen and substituted or unsubstituted C1 to C6 alkyl, $n_{31}$, $n_{33}$, $n_{34}$, and $n_{37}$ to $n_{40}$ are independently integers ranging from 0 to 4, and $n_{30}$, $n_{32}$, $n_{35}$, and $n_{36}$ are independently integers of 0 or 1.

8. The liquid crystal photoalignment agent of claim 1, wherein the aromatic diamine is a functional diamine selected from the group consisting of compounds of the following Chemical Formulae 14 to 16:

[Chemical Formula 14]

wherein, in the above Formula 14, $R_{41}$ is selected from the group consisting of hydrogen, substituted or unsubstituted C1 to C20 alkyl, substituted or unsubstituted C1 to C30 aryl, and a substituted or unsubstituted C2 to C30 heteroaryl, and $R_{42}$ is selected from the group consisting of substituted or unsubstituted C1 to C20 alkyl, substituted or unsubstituted C1 to C30 aryl, and substituted or unsubstituted C2 to C30 heteroaryl, and $n_{42}$ is an integer ranging from 0 to 3,

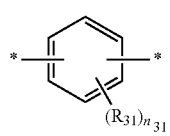

[Chemical Formula 11]

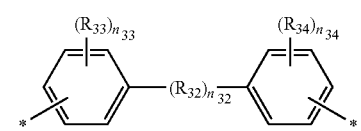

[Chemical Formula 12]

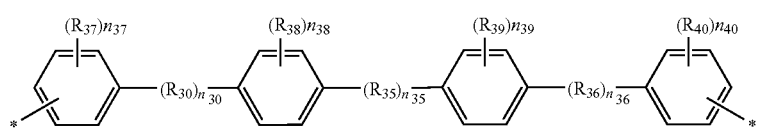

[Chemical Formula 13]

[Chemical Formula 15]

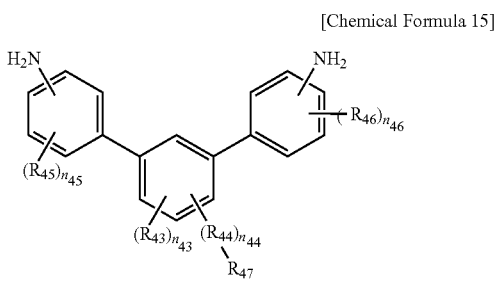

wherein, in the above Formula 15, $R_{43}$, $R_{45}$, and $R_{46}$ are independently selected from the group consisting of substituted or unsubstituted C1 to C20 alkyl, substituted or unsubstituted C1 to C30 aryl, and substituted or unsubstituted C2 to C30 heteroaryl, $R_{44}$ is selected from the group consisting of O, COO, CONH, OCO, and substituted or unsubstituted C1 to C10 alkylene, $R_{47}$ is selected from the group consisting of hydrogen, substituted or unsubstituted C1 to C20 alkyl, substituted or unsubstituted C1 to C30 aryl, substituted or unsubstituted C2 to C30 heteroaryl, and alkyl, aryl, and heteroaryl substituted with —O—, —COO—, —CONH—, —OCO—, or a combination thereof, $n_{43}$ is an integer of 0 or 3, $n_{45}$ and $n_{46}$ are independently integers ranging from 0 to 4, and $n_{44}$ is an integer of 0 or 1,

[Chemical Formula 16]

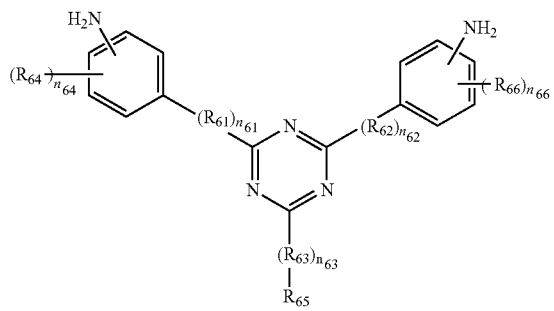

wherein, in the above Formula 16, $R_{64}$ and $R_{66}$ are independently selected from the group consisting of substituted or unsubstituted C1 to C20 alkyl, substituted or unsubstituted C1 to C30 aryl, and substituted or unsubstituted C2 to C30 heteroaryl, $R_{65}$ is selected from the group consisting of hydrogen, substituted or unsubstituted C1 to C20 alkyl, substituted or unsubstituted C1 to C30 aryl, and substituted or unsubstituted C2 to C30 heteroaryl, $R_{61}$ and $R_{62}$ are independently selected from the group consisting of O and COO, $R_{63}$ is selected from the group consisting of O, COO, CONH, and OCO, $n_{64}$ and $n_{66}$ are independently integers ranging from 0 to 4, and $n_{61}$ to $n_{63}$ are independently integers of 0 or 1.

9. The liquid crystal photoalignment agent of claim 1, wherein the cinnamate-based photodiamine is selected from the group consisting of compounds of the following Formula 17, compounds of the following Formula 18, and combinations thereof:

[Chemical Formula 17]

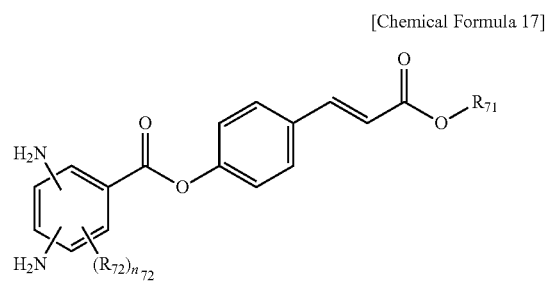

wherein, in the above Formula 17, $R_{71}$ is selected from the group consisting of hydrogen, substituted or unsubstituted C1 to C30 alkyl, substituted or unsubstituted C6 to C30 aryl, and substituted or unsubstituted C2 to C30 heteroaryl, and $R_{72}$ is selected from the group consisting of substituted or unsubstituted C1 to C30 alkyl, substituted or unsubstituted C6 to C30 aryl, and substituted or unsubstituted C2 to C30 heteroaryl, and $n_{72}$ is an integer ranging from 0 to 3,

[Chemical Formula 18]

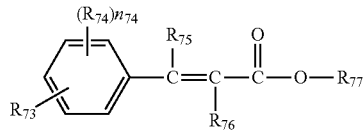

wherein, in the above Formula 18, $R_{77}$ is selected from the group consisting of aromatic diamines, diamines including substituted or unsubstituted linear or branched C1 to C24 alkylene, and combinations thereof, wherein the substituted alkylene of $R_{77}$ is selected from the group consisting of substituted alkylene wherein hydrogen is substituted with a substituent selected from the group consisting of halogen and cyano, substituted alkylene wherein at least one $CH_2$ group is substituted with a substituent selected from the group consisting of substituted or unsubstituted C2 to C30 arylene, substituted or unsubstituted C2 to C30 heteroarylene, substituted or unsubstituted C3 to C30 cycloalkylene, substituted or unsubstituted C2 to C30 heterocycloalkylene, —O—, —CO—, —CO—O—, —O—CO—, —Si$(CH_3)_2$—O—Si$(CH_3)_2$—, —NR'—, —NR'—CO—, —CO—NR'—, —NR'—CO—O—, —O—CO—NR'—, —NR'—, —CO—NR'—, —CH=CH—, —C≡C—, and —O—CO—O—, wherein R' is selected from the group consisting of hydrogen and substituted or unsubstituted C1 to C6 alkyl, and wherein adjacent $CH_2$ groups are not substituted, and combinations thereof, $R_{74}$ is selected from the group consisting of substituted or unsubstituted C1 to C20 alkyl, substituted or unsubstituted C1 to C30 aryl, and substituted or unsubstituted C2 to C30 heteroaryl, and $n_{74}$ is an integer ranging from 0 to 4, $R_{75}$ and $R_{76}$ are independently selected from the group consisting of hydrogen, halogen, cyano, and substituted or unsubstituted C1 to C12 alkyl, wherein the substituted alkyls of $R_{75}$ and $R_{76}$ are selected from the group consisting of substituted alkyl wherein hydrogen is substituted with a substituent selected from the group consisting of halogen and cyano, substituted alkyl wherein at least one CH$_2$ group is substituted with a substituent selected from the group consisting of —O—, —CO—O—, —O—CO—, and —CH=CH—, wherein adjacent CH$_2$ groups are not substituted, and combinations thereof, R$_{73}$ is selected from the group consisting of substituted or unsubstituted C1 to C30 alkyl, substituted or unsubstituted C7 to C30 alkylaryl, substituted or unsubstituted C3 to C30 cycloalkyl, substituted or unsubstituted pyrimidinyl, substituted or unsubstituted pyridinyl, substituted or unsubstituted thiophenyl, substituted or unsubstituted furanyl, substituted or unsubstituted naphthyl, and substituted or unsubstituted phenyl, wherein the substituted alkyl of R$_{73}$ is selected from the group consisting of substituted alkyl wherein hydrogen is substituted with a substituent selected from the group consisting of halogen and cyano, substituted alkyl wherein at least one CH$_2$ group is substituted with a substituent selected from the group consisting of —O—, —CO—O—, —O—CO—, and —CH=CH—, wherein adjacent CH$_2$ groups are not substituted, and combinations thereof, and wherein the substituted alkylaryl of R$_{73}$ is substituted alkylaryl where at least one CH$_2$ group is substituted with a substituent selected from the group consisting of —O—, —CO—O—, —O—CO—, —CH=CH—, and combinations thereof, wherein adjacent CH$_2$ groups are not substituted.

10. The liquid crystal photoalignment agent of claim 1, wherein the chalcone-based photodiamine is a compound of the following Formula 19:

[Chemical Formula 19]

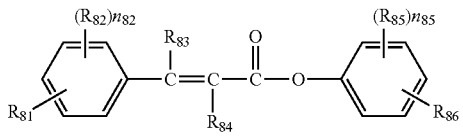

wherein, in the above Formula 19, R$_{81}$ is selected from the group consisting of aromatic diamines, diamines including substituted or unsubstituted linear or branched C1 to C24 alkylene, and combinations thereof, wherein the substituted alkylene of R$_{81}$ is selected from the group consisting of substituted alkylene wherein hydrogen is substituted with a substituent selected from the group consisting of halogen and cyano, a substituted alkylene where at least one CH$_2$ group is substituted with a substituent selected from the group consisting of substituted or unsubstituted C2 to C30 arylene, substituted or unsubstituted C2 to C30 heteroarylene, substituted or unsubstituted C3 to C30 cycloalkylene, substituted or unsubstituted C2 to C30 heterocycloalkylene, —O—, —CO—, —CO—O—, —O—CO—, —Si(CH$_3$)$_2$—O—Si(CH$_3$)$_2$—, —NR'—, —NR'—CO—, —CO—NR'—, —NR'—CO—O—, —O—CO—NR'—, —NR'—, —CO—NR'—, —CH=CH—, —C≡C—, and —O—CO—O—, wherein R' is selected from the group consisting of hydrogen and substituted or unsubstituted C1 to C6 alkyl, and wherein adjacent CH$_2$ groups are not substituted, and combinations thereof, R$_{82}$ and R$_{85}$ are selected from the group consisting of substituted or unsubstituted C1 to C20 alkyl, substituted or unsubstituted C1 to C30 aryl, and substituted or unsubstituted C2 to C30 heteroaryl, and n$_{82}$ and n$_{85}$ are integers ranging from 0 to 4, R$_{83}$ and R$_{84}$ are independently selected from the group consisting of hydrogen, halogen, cyano, and substituted or unsubstituted C1 to C12 alkyl, wherein the substituted alkyls of R$_{83}$ and R$_{84}$ are selected from the group consisting of substituted alkyl wherein hydrogen is substituted with a substituent selected from the group consisting of halogen and cyano, substituted alkyl wherein at least one CH$_2$ group is substituted with a substituent selected from the group consisting of —O—, —CO—O—, —O—CO—, and —CH=CH—, wherein adjacent CH$_2$ groups are not substituted, and combinations thereof, R$_{86}$ is selected from the group consisting of substituted or unsubstituted C1 to C30 alkyl, substituted or unsubstituted C7 to C30 alkylaryl, substituted or unsubstituted C3 to C30 cycloalkyl, substituted or unsubstituted pyrimidinyl, substituted or unsubstituted pyridinyl, substituted or unsubstituted thiophenyl, substituted or unsubstituted furanyl, substituted or unsubstituted naphthyl, and substituted or unsubstituted phenyl, wherein the substituted alkyl of R$_{86}$ is selected from the group consisting of substituted alkyl wherein hydrogen is substituted with a substituent selected from the group consisting of halogen and cyano, substituted alkyl where at least one CH$_2$ group is substituted with a substituent selected from the group consisting of —O—, —CO—O—, —O—CO—, and —CH=CH—, wherein adjacent CH$_2$ groups are not substituted, and combinations thereof, and wherein the substituted alkylaryl of R$_{86}$ is a substituted alkylaryl wherein at least one CH$_2$ group is substituted with a substituent selected from the group consisting of —O—, —CO—O—, —O—CO—, —CH=CH—, and combinations thereof, wherein adjacent CH$_2$ groups are not substituted.

11. The liquid crystal photoalignment agent of claim 1, wherein the cumarin-based photodiamine is a compound of the following Formula 20:

[Chemical Formula 20]

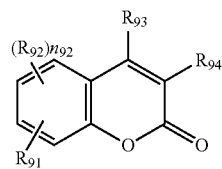

wherein, in the above Formula 20,

R$_{91}$ is selected from the group consisting of aromatic diamines, diamines including substituted or unsubstituted linear or branched C1 to C24 alkylene, and combinations thereof, wherein the substituted alkylene of R$_{91}$ is selected from the group consisting of substituted alkylene wherein hydrogen is substituted with a substituent selected from the group consisting of halogen and cyano, substituted alkylene wherein at least one CH$_2$ group is substituted with a substituent selected from the group consisting of substituted or unsubstituted C2 to C30 arylene, substituted or unsubstituted C2 to C30 heteroarylene, substituted or unsubstituted C3 to C30 cycloalkylene, a substituted or unsubstituted C2 to C30 heterocycloalkylene, —O—, —CO—, —CO—O—, —O—CO—, —Si(CH$_3$)$_2$—

O—Si(CH$_3$)$_2$—, —NR'—, —NR'—CO—, —CO—NR'—, —NR'—CO—O—, —O—CO—NR'—, —NR'—CO—NR'—, —CH═CH—, —C≡C—, and —O—CO—O—, wherein R' is selected from the group consisting of hydrogen and substituted or unsubstituted C1 to C6 alkyl, and wherein adjacent CH$_2$ groups are not substituted, and combinations thereof, R$_{92}$ is selected from the group consisting of substituted or unsubstituted C1 to C20 alkyl, substituted or unsubstituted C1 to C30 aryl, and substituted or unsubstituted C2 to C30 heteroaryl, and n$_{92}$ is an integer ranging from 0 to 4, R$_{93}$ and R$_{94}$ are independently selected from the group consisting of hydrogen, halogen, cyano, and substituted or unsubstituted C1 to C12 alkyl, and wherein the substituted alkyls of R$_{93}$ and R$_{94}$ are selected from the group consisting of substituted alkyl wherein hydrogen is substituted with a substituent selected from the group consisting of halogen and cyano, substituted alkyl wherein at least one CH$_2$ group is substituted with a substituent selected from the group consisting of —O—, —CO—O—, —O—CO—, and —CH═CH—, wherein adjacent CH$_2$ groups are not substituted, and combinations thereof.

12. The liquid crystal photoalignment agent of claim 1, wherein the liquid crystal photoalignment agent comprises 1 to 90 parts by weight of the polyamic acid or 1 to 50 parts by weight of the polyimide polymer, and 0.001 to 90 parts by weight of the polyimide photopolymer.

13. The liquid crystal photoalignment agent of claim 12, wherein the liquid crystal photoalignment agent comprises 1 to 90 parts by weight of the polyamic acid or 1 to 40 parts by weight of the polyimide polymer, and 1 to 60 parts by weight of the polyimide photopolymer.

14. The liquid crystal photoalignment agent of claim 1, wherein the liquid crystal photoalignment agent comprises 1 to 90 parts by weight of the polyamic acid, 1 to 50 parts by weight of the polyimide polymer, and 1 to 90 parts by weight of the polyimide photopolymer.

15. A liquid crystal photoalignment film fabricated by applying the liquid crystal photoalignment agent according to claim 1 on a substrate.

16. A liquid crystal display (LCD) comprising the liquid crystal photoalignment film according to claim 15.

17. The liquid crystal photoalignment agent of claim 1, comprising a combination of the polyamic acid represented by Chemical Formula 1 and the polyimide polymer represented by Chemical Formula 2, wherein R$_1$, R$_3$, and R$_5$ are each a quadrivalent organic group derived from an aliphatic cyclic acid dianhydride; R$_2$ and R$_4$ are each a divalent organic group derived from an aromatic diamine; and R$_6$ is a divalent organic group derived from cinnamate-based photodiamine.

18. The liquid crystal photoalignment agent of claim 17, wherein R$_1$, R$_3$, and R$_5$ are each a quadrivalent organic group derived from 1,2,3,4-cyclobutanetetracarboxylic acid dianhydride; R$_2$ and R$_4$ are each a divalent organic group derived from 3,5-diaminophenyldecyl succinimide; and R$_6$ is a divalent organic group derived from diamino benzoic acid 4-(2-ethoxycarbonyl-vinyl)-phenyl ester.

* * * * *

UNITED STATES PATENT AND TRADEMARK OFFICE
CERTIFICATE OF CORRECTION

PATENT NO.       : 8,425,799 B2
APPLICATION NO.  : 12/676012
DATED            : April 23, 2013
INVENTOR(S)      : Kwak et al.

It is certified that error appears in the above-identified patent and that said Letters Patent is hereby corrected as shown below:

In the Specification

Column 9, Line 1 reads: "$R_{66}$ is a substituent selected from the group consisting of"
and should read: "$R_{65}$ is a substituent selected from the group consisting of"

In the Claims

Column 31, Claim 10, Lines 36-41, Chemical Formula 19 is depicted as:

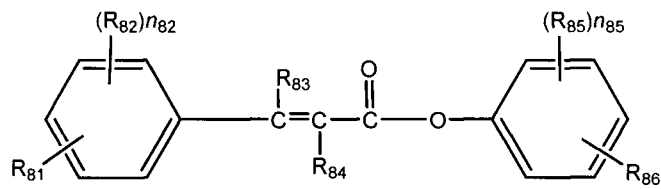

and should be depicted as:

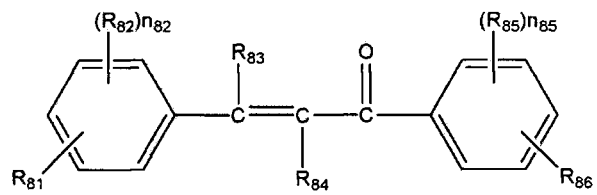

Signed and Sealed this
Ninth Day of July, 2013

Teresa Stanek Rea
*Acting Director of the United States Patent and Trademark Office*